United States Patent [19]
Chen et al.

[11] Patent Number: 5,812,229
[45] Date of Patent: Sep. 22, 1998

[54] HOLOGRAPHIC REFLECTIVE COLOR LIQUID CRYSTAL DISPLAY DEVICE

[75] Inventors: Alan G. Chen, Schaumburg; Kevin W. Jelley, Lagrange Park; George T. Valliath, Buffalo Grove, all of Ill.

[73] Assignee: Motorola, Inc., Schaumburg, Ill.

[21] Appl. No.: 641,395

[22] Filed: May 1, 1996

[51] Int. Cl.⁶ .............................. G02F 1/1335; G02F 1/13
[52] U.S. Cl. ..................... 349/113; 349/117; 349/179; 359/15
[58] Field of Search ................................ 349/113, 117, 349/179; 359/15

[56] References Cited

U.S. PATENT DOCUMENTS

| | | | |
|---|---|---|---|
| 4,973,131 | 11/1990 | McDonald et al. | 350/174 |
| 5,011,244 | 4/1991 | Smith et al. . | |
| 5,267,060 | 11/1993 | Colton . | |
| 5,594,560 | 1/1997 | Jelley et al. | 359/15 |

FOREIGN PATENT DOCUMENTS

360254023 A  12/1985  Japan ..................... 349/117

*Primary Examiner*—William L. Sikes
*Assistant Examiner*—Julie Ngo
*Attorney, Agent, or Firm*—Douglas D. Fekete; John B. MacIntyre

[57] ABSTRACT

A liquid crystal display device (10) includes a front polarizer (12), a liquid crystal cell (14), a retardation film (16), a back polarizer (18), and a reflective holographic optical element (20). Diffuse ambient light illuminates the front polarizer (12), which polarizes the ambient light and transmits the polarized light to the liquid crystal cell (14). The liquid crystal cell (14) receives the polarized light and transmits polarized light derived from the incident polarized light to the retardation film (16). The retardation film (16) receives the polarized light and transmits polarized light, including light within a selected spectral band. The back polarizer (18) receives the polarized light from the retardation film (16) and selectively transmits polarized light derived from the incident polarized light. The reflective holographic optical element (20) receives polarized light from the back polarizer (18) and redirects the polarized light toward the back polarizer (18), wherein the light has an effective spectral band that includes light in the selected spectral band.

17 Claims, 1 Drawing Sheet

HOLOGRAPHIC REFLECTIVE COLOR LIQUID CRYSTAL DISPLAY DEVICE

FIELD OF THE INVENTION

This invention relates generally to a liquid crystal display device that employs a reflective holographic optical element to illuminate the display device using diffuse ambient light. More particularly, this invention relates to such a device wherein the reflective holographic optical element is utilized in combination with a retardation film to select light within predetermined spectral bands in forming a color display.

BACKGROUND OF THE INVENTION

A typical liquid crystal display device, more commonly referred to as an LCD device, comprises a liquid crystal panel for forming a display that is viewed through a front side of the panel. The liquid crystal display device includes front and back polarizers. Transparent electrodes are affixed to the inner surfaces of the liquid crystal panel to alter the light transmission properties of the liquid crystal material in the adjacent region of the panel. In this manner, the electrodes define pixels that create the display. As used herein, pixels refer to a region of the liquid crystal panel that forms a light or dark area of the display. A common display is formed of pixels that are dots arranged in a rectangular array. Another common type of display comprises pixels arranged in a "figure 8" pattern and selectively switched between transparent and opaque states to form alphanumeric characters.

While the LCD device creates a display by altering the light transmission properties of the pixels, the LCD device does not generate the light needed for viewing the display. There are two basic approaches for providing light for the display. A first approach utilizes ambient light and comprises a reflector facing the back side of the LCD device. At a transparent region, ambient light is polarized by the front polarizer, is rotated by the liquid crystal panel, and is reflected by the reflector towards the front of the LCD device to create a bright pixel. At a region that is opaque, light is not rotated by the liquid crystal panel, thereby creating a dark pixel. In this manner, LCD devices alternate pixels between bright and opaque states, thereby allowing alphanumeric and other symbols to be displayed on the LCD device to convey information to a user of the LCD device.

Under certain circumstances, however, there is an inadequate amount of ambient light to sufficiently illuminate the LCD device. In these instances, a second approach for providing light for the display is utilized wherein an LCD device utilizes a light source for illuminating the back side of the liquid crystal panel. The light is screened by the back polarizer and traverses transparent regions of the liquid crystal panel to create bright pixels in the display.

Currently, color liquid crystal displays are fabricated by adding a color filter to the LCD device. However, due to the light loss associated with color filters, backlights are generally required. Adding a backlight, however, leads to greater power consumption and an increased cost for the device utilizing the backlight. It is desired to produce a color display that utilizes reflected ambient light for illumination, more commonly referred to as a reflective color LCD device.

A benefit of reflective color LCD devices is that they consume little power, since they do not have a backlight element and utilize ambient light to provide illumination for the display. Reflective color LCD devices reflect ambient light that is transmitted through the LCD device off a reflector positioned opposite the viewing side of the display device. Reflective color LCD devices achieve color by imparting differential retardation to different frequencies of light, which when passed through the back polarizer emerges as colored spectral bands.

However, problems exist regarding reflective color LCD devices. A first problem is insufficient lighting produced by the reflector. Conventional reflectors cover broad spectral bands and scatter light into spatial angles from 0 to 180 degrees. Light scattered outside of the viewing cone of the user is not used to illuminate the display within the viewing cone. Consequently, this light is lost for useful purposes. A second problem with reflective color LCD devices is that the color selection capability is poor and the spectral band is very broad. Consequently, color contrast of current reflective color LCD devices is poor. A third problem with reflective color LCD devices relates to glare inherent in a preferential viewing angle. As used herein, glare refers to a reflection of incident light off the front side of the display device which has no utility and decreases the contrast of the display device. Since conventional reflectors reflect light at substantially the same angle as incident light, the area of brightest illumination in current reflective color LCD devices corresponds to the angle with the greatest amount of glare present. This glare greatly reduces the effectiveness of the display by reducing the contrast between bright and dark pixels.

One approach taken to create an LCD device without a backlight has been to affix a retardation film between the liquid crystal cell and the back polarizer. The combination of liquid crystal cells with retardation films is somewhat effective to transmit light within a certain color band. However, this combination also transmits light outside the desired color band, thereby preventing accurate selection of specific colors.

Therefore, a need exists for a liquid crystal display device that consumes little power and is capable of providing a bright, well-contrasted display area. Further, there is a need for a liquid crystal display device wherein the pixels are highly selectable for specific colors.

DETAILED DESCRIPTION OF A PREFERRED EMBODIMENT

Figure 1:
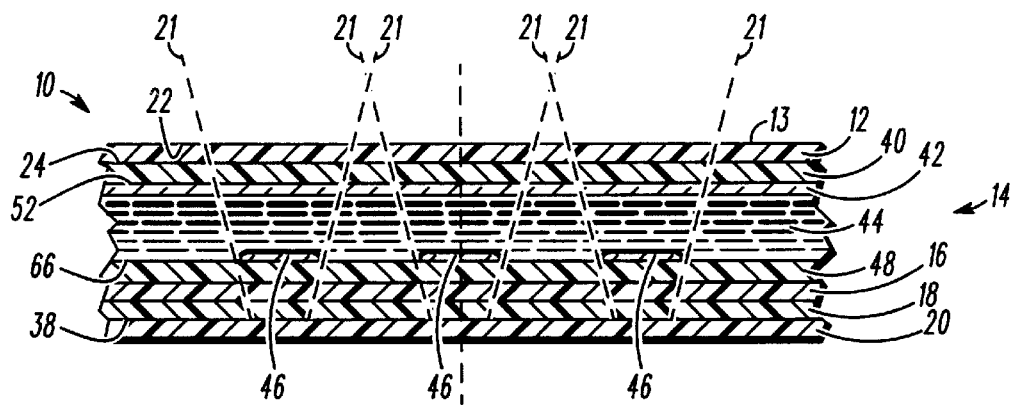
FIG. 1 is a cross-sectional view of a liquid crystal display device in accordance with a preferred embodiment of the present invention.

Referring to FIG. 1, in accordance with a preferred embodiment of the present invention, a liquid crystal display device 10 comprises, as major components, a front polarizer 12, a liquid crystal cell 14, a retardation film 16, a back polarizer 18, and a reflective holographic optical element 20. Display device 10 produces a display that is illuminated by diffuse ambient light and is viewed through front side 13 of device 10, which in a preferred embodiment corresponds to front polarizer front side 22. As used herein, diffuse ambient light refers to lighting such as found in a well-lit room and in which light tends to irradiate liquid crystal display device 10 from multiple directions and with varying intensity. The ambient light coming from multiple sources and multiple directions cooperates in illuminating the display for viewing. In a typical room, diffuse ambient light is characterized by a broad spectral band that generally corresponds to the visible spectrum and is a combination of light within multiple spectral bands.

Front polarizer 12 is made of a polymeric material and is effective to emit polarized light. In a preferred embodiment, front polarizer 12 emits linearly polarized light. Front polarizer 12 includes front side 22 and back side 24, opposite front side 22. Front polarizer 12 filters ambient light incident upon front side 22 and emits linearly polarized light, wherein the linearly polarized light is within the broad spectrum corresponding to ambient light. The linearly polarized light is transmitted toward liquid crystal cell 14 and retardation film 16, which are optically coupled thereto. As used herein, optically coupled refers to elements which can bi-directionally transmit and receive light.

Liquid crystal cell 14 is of the type that is readily commercially available and is comprised of front plate 40, front electrode 42, liquid crystal 44, back electrodes 46, and back plate 48. Liquid crystal 44 comprises a layer of liquid crystal material sandwiched between transparent plates, front plate 40 and back plate 48. Front electrode 42 is affixed to inner surface 52 of front plate 40, adjacent to liquid crystal 44. Back electrodes 46 are affixed to inner surface 66 of back plate 48, adjacent to liquid crystal 44. Preferably, front electrode 42 and back electrodes 46 are formed of a transparent indium-tin oxide material. Electrodes 42 and 46 are connected to an external power supply, not shown.

In a preferred embodiment, liquid crystal cell 14 is an electrically controlled birefringence effect liquid crystal cell, commonly referred to as an ECB cell. By varying the voltage at each pixel, a variable amount of retardation is added to the incident linearly polarized light at that pixel. The amount of retardation is dependent upon the voltage applied across each pixel. Thus, cell 14 varies the polarization state of the incident linearly polarized light at each pixel. The polarization state of the light emitted from the liquid crystal cell at the pixel is in general elliptical, and varies with the frequency, or color, of the light. In this manner, light can be selected to be emitted, when ultimately passed through back polarizer 18, with certain color properties by changing the voltage at each pixel. The color selection of each pixel can be further enhanced through the use of a retardation film, as later described.

It is a feature of the preferred embodiment of this invention that each pixel of liquid crystal display device 10 selects light within a predetermined spectral band in order to create a desired color pixel for the display. Transparent electrodes 42 and 46 are affixed to inner surfaces 52 and 66 of transparent plates 40 and 48 to alter the light transmission properties of the liquid crystal material in the adjacent region of the panel. In this manner, electrodes 42 and 46 define pixels that create the display. Depending on the applied electrical potential supplied to each pixel by front electrode 42 and back electrodes 46, elliptically polarized light having desired properties is transmitted by cell 14. In a preferred embodiment, one of four colors can be selected by changing the voltage applied to liquid crystal cell 14 in order to selectively emit elliptically polarized light having desired properties.

In an alternate embodiment, liquid crystal cell 14 is a super twisted nematic cell, commonly referred to as an STN cell.

In a further alternate embodiment, liquid crystal cell 14 is a twisted nematic cell, more commonly referred to as a TN cell. Typical TN cells rotate linearly polarized light at bright pixels, sometimes referred to as on-state, 90 degrees and do not rotate light at dark pixels, sometimes referred to as off-state. Back polarizer 18 preferably has an axis of polarization offset 90° from the axis of polarization of front polarizer 12, thereby allowing light rotated 90° by cell 14 to pass through back polarizer 18. By adding retardation film 16 to display device 10, colors can be selected for the display. Devices utilizing TN cells can utilize two colors for their displays, a first color for the bright areas of the display, and a second color for the dark areas of the display. These colors can be selected by using a retardation film which elliptically polarizes light to emit light that is within the spectral bands of the two predetermined colors. This allows selection of well-contrasted, aesthetically pleasing display colors for use in twisted nematic liquid crystal display devices.

Retardation film 16 is optically coupled to cell 14 and receives polarized light. Retardation film 16 is birefringent, or refractive index anisotropic. Therefore, the refractive index of any axis of retardation film 16 differs from the refractive index of the corresponding perpendicular axis. Consequently, light incident upon retardation film 16 becomes elliptically polarized due to the difference in propagation velocities of the incident light at the time of traversal through retardation film 16.

Retardation film 16 is constructed of an anisotropic polymeric material and is effective to emit elliptically polarized light toward back polarizer 18. A suitable retardation film is commercially available from Nitto Denko under the trade designation "NRZ", and is supplied as a retardation film laminated to a linear polarizer. The orientation of retardation film 16 is selected to maximize the distinction of color as light passes through cell 14. The selection of color is achieved by adjusting the voltage applied to each pixel of cell 14.

Back polarizer 18 is optically coupled to retardation film 16 to receive elliptically polarized light therefrom. Back polarizer 18 is made of a polymeric material and filters elliptically polarized light incident upon it and, in a preferred embodiment, emits linearly polarized light having a predetermined axis of polarization. Only a portion of the elliptically polarized light that has an axis of polarization aligned with the axis of polarization passes through back polarizer 18. Back polarizer 18 transmits the linearly polarized light toward reflective holographic optical element 20.

In a preferred embodiment, reflective holographic optical element 20 is a volume holographic optical element composed of a photopolymeric film having regions of differing indices of refraction that cooperate, in a manner similar to a diffraction grating, to redirect light in an interference pattern. Reflective holographic optical element 20 comprises a reflective holographic optical element front side 38 from which reflected light appears to emanate. A suitable holographic optical element is commercially available from the Polaroid Corporation under the trade designation "Imagix" and includes a layer composed of a photopolymer having the trade designation "DMP-128", which is exposed to laser light and developed to form regions of varying indices of refraction that are effective to redirect light in an interference pattern corresponding to a reflection pattern preferential viewing cone 21 for use in liquid crystal display device 10.

Preferential viewing cone 21 is an area emanating from front side 13 of display device 10 wherein light is effectively transmitted out of the appropriate pixels to create a usable display area. Reflective holographic optical element 20 redirects light within certain spectral patterns, which increases the apparent brightness of liquid crystal display device 10. The spectral patterns each have a viewing cone, and the viewing cones are aligned to ensure that the color emitted is well-mixed. This eliminates color banding and ensures equal light distribution for the display. In a preferred embodiment, reflective holographic optical element 20 redirects light within reflective spectral bands that include a predetermined spectral band. The predetermined spectral band correlates to a predetermined color. The predetermined spectral band or the effective spectral band preferably has a maximum bandwidth of approximately 70 nanometers. Preferential viewing cone 21 also is directed at an angle that is different from the angle of reflection of incident light upon display device 10. In a preferred embodiment, the angle of light emitted by reflective holographic optical element 20 is offset twenty degrees from the reflection angle of incident ambient light striking front side 13, thereby eliminating glare and significantly increasing apparent brightness. In tests with the present invention, apparent brightness was increased by 220% over current color reflective displays.

To create a display, front side 13 of liquid crystal display device 10 is illuminated by diffuse ambient light. The ambient light is predominantly white light and is formed of light of multiple colors, each color being characterized by wavelengths within a predetermined spectral band within the visible spectrum. At each pixel, display device 10 selects an individual color from the broad ambient spectrum and emits the desired color to produce a bright pixel for the display. Front polarizer 12 polarizes the ambient light and transmits linearly polarized light having a first axis of polarization. Although linearly polarized, this light is also characterized by wavelengths of multiple colors. The linearly polarized light from front polarizer 12 is received by liquid crystal cell 14. As the light passes through cell 14, the liquid crystal material changes the polarization state. For a particular wavelength, the polarization state is dependent upon the electrical potential applied by front electrode 42 and back electrode 46 to the pixel. Nevertheless, the polarized light emanating from cell 14 includes wavelengths corresponding to multiple colors.

The light, which in a preferred embodiment has been elliptically polarized by liquid crystal cell 14, is received by retardation film 16. Retardation film 16 adds constant retardation to the light, effective to narrow the spectral bands.

Figure 2:
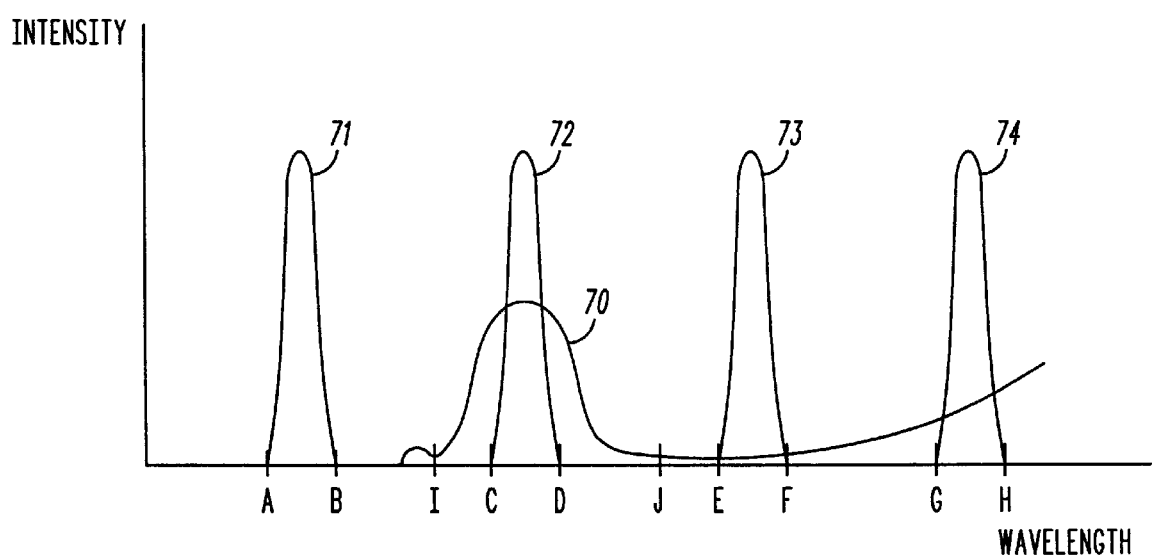
FIG. 2 is a graph showing reflected light as a function of wavelength in accordance with the present invention.

Referring to FIG. 2, prior art reflection pattern 70 depicts a reflection pattern produced by a prior art diffuse reflector. In contrast, a preferred reflection pattern is depicted by holographic reflector reflection pattern 72 such that, within the pattern, the light exhibits more highly selectable and higher contrasted light, in addition to a greater intensity. This results in enhanced brightness for the display device. In tests conducted with a conventional reflector, the spectral radiance of light having a wavelength of 552 nanometers was 6.632 milliwatts per steradian per square meter per nanometer. The spectral radiance of light using a holographic optical element at 552 nanometers was 13.34 milliwatts per steradian per square meter per nanometer. This is approximately a two-fold increase in the spectral radiance of light of a desired wavelength.

FIG. 2 shows a plot of intensity of reflected light as a function of wavelength of the light transmitted for a preferred holographic optical element 20 through retardation film 16. In a preferred embodiment, four spectral bands, band 71, band 72, band 73, and band 74 are desired for display device 10.

Although a preferred embodiment of the present invention utilizes four distinct spectral bands, any other reasonable number of distinct color bands can be used. For instance, a two-color display or an eight-color display could be created using the present invention. Also, selectable colors, as chosen by adjusting the peak wavelength of each distinct spectral band, can be used within the scope of the present invention.

Spectral band 71 comprises light between wavelengths A and B.

Spectral band 72 comprises light between wavelengths C and D.

Spectral band 73 comprises light between wavelengths E and F.

Spectral band 74 comprises light between wavelengths G and H.

Prior art reflection pattern 70 comprises light having wavelengths generally between I and J, but as can be seen in FIG. 2, also consists of light having wavelengths outside of I and J. Although retardation film 16 is generally effective in reducing the light outside a designated range, some light outside the range is nevertheless transmitted. However, due to its narrow bandwidth and high intensity, the light emitted by display device 10 is bright and exhibits enhance color integrity, thereby increasing the contrast between colors in the display.

Back polarizer 18 receives the elliptically polarized light and emits linearly polarized light. The linearly polarized light passes to reflective holographic optical element 20. Light having wavelengths within one of the reflective spectral bands of reflective holographic optical element 20 is redirected by reflective holographic optical element 20 towards back polarizer 18. In this example, the light selected from retardation film 16, represented by curve 70, falls generally within effective spectral band 72 of reflective holographic optical element 20. Light outside curve 72, even though within curve 70, is not redirected and is thus lost for purposes of the display. At the same time, the light reflected by reflective holographic optical element 20 is directed toward front side 13 and is within preferential viewing cone 21.

The redirected light passes through back polarizer 18 and is transmitted to retardation film 16. Retardation film 16 translates the linearly polarized light into elliptically polarized light and is passed through cell 14 and subsequently through front polarizer 12. Front polarizer 12 emits light that is linearly polarized and within preferential viewing cone 21, thereby creating a bright colored pixel for the display.

The present invention provides a liquid crystal display device that uses ambient light for device illumination and utilizes no back light. Consequently, the invention consumes less power than a device illuminated by a back light. Further, since the disclosed reflective color liquid crystal display device uses no color filters, the display brightness is greatly increased compared to LCD devices which utilize color filters, due to increased intensity within selected spectral bands.

Also, since the angle with which the reflective holographic optical element reflects light is different from the angle of reflection of incident light, glare is reduced in the display, thereby increasing the apparent brightness and contrast of the display. The present invention provides a bright, well-contrasted display with highly selective colors for use in, among other applications, hand-held and portable products.

While this invention has been described in terms of certain examples thereof, it is not intended that it be limited to the above description, but rather only to the extent set forth in the claims that follow.

The embodiments of this invention in which an exclusive property or privilege is claimed are defined as follows:

1. A liquid crystal display device comprising:

a front polarizer effective to transmit linearly polarized light having frequencies within a broad spectral band;

a liquid crystal cell having at least one region having a transparent mode effective to transmit elliptically polarized light;

a retardation film effective to transmit elliptically polarized light;

said liquid crystal cell and said retardation film being optically coupled to emit elliptically polarized light that includes light within a selected spectral band and characterized by a predetermined polarization axis;

a back polarizer optically coupled to the liquid crystal cell and the retardation film and effective to filter light and to transmit linearly polarized light having an axis corresponding to the predetermined polarization axis; and a reflective holographic optical element optically coupled to the back polarizer and having an effective spectral band for redirecting light within the selected spectral band.

2. A liquid crystal display device in accordance with claim 1, wherein the effective spectral band exhibits a bandwidth narrower than the selected spectral band.

3. A liquid crystal display device in accordance with claim 1, wherein the liquid crystal cell receives the linearly polarized light from the front polarizer and transmits elliptically polarized light in a transparent region through the retardation film to the back polarizer.

4. A liquid crystal display device in accordance with claim 1, wherein the retardation film is effective to transform the linearly polarized light from the front polarizer to elliptically polarized light.

5. The liquid crystal display device in accordance with claim 1 wherein the retardation film comprises a birefringent polymeric material.

6. A liquid crystal display device in accordance with claim 1, wherein the reflective holographic optical element is effective to redirect light in a preferential viewing cone.

7. A liquid crystal display device in accordance with claim 6, wherein the preferential viewing cone comprises a preferential viewing angle different from an angle of reflection of incident light.

8. A liquid crystal display device in accordance with claim 7, wherein the difference between the preferential viewing angle and the angle of reflection of incident light is about twenty degrees.

9. A liquid crystal display device in accordance with claim 1 wherein the back polarizer is optically coupled to the front polarizer through the retardation film and the liquid crystal cell.

10. A liquid crystal display device in accordance with claim 1, wherein the liquid crystal cell comprises an electrically controlled birefringent liquid crystal cell.

11. A liquid crystal display device in accordance with claim 1, wherein the liquid crystal cell comprises a super twisted nematic liquid crystal cell.

12. A liquid crystal display device in accordance with claim 1, wherein the liquid crystal cell comprises a twisted nematic liquid crystal cell.

13. A liquid crystal display device in accordance with claim 1, wherein the effective spectral band has a bandwidth not greater than about 70 nanometers.

14. The liquid crystal display device in accordance with claim 1 wherein the holographic film comprises a polymeric film, the polymeric film having regions of varying indices of refraction effective to redirect the light into a preferential viewing cone.

15. A liquid crystal display device in accordance with claim 1, wherein the liquid crystal cell contains an optically anisotropic liquid crystal material for transmitting light within a plurality of distinct selected spectral bands, and wherein the reflective holographic optical element is effective for redirecting light within the plurality of distinct selected spectral bands.

16. The liquid crystal display device in accordance with claim 15 wherein the anisotropic liquid crystal material has frequency selective polarization properties responsive to electrical energy applied to the liquid crystal display.

17. A liquid crystal display device for forming a display illuminated by diffuse ambient light, said liquid crystal display device comprising:

a front polarizer having a front polarizer front side illuminated by diffuse ambient light for viewing the display and effective to selectively transmit linearly polarized light within a broad spectral band that includes a predetermined color;

a liquid crystal cell optically coupled to the front polarizer and having at least one region having a transparent mode, said liquid crystal cell being effective to vary the polarization of the predetermined color through the region in the transparent mode;

a retardation film optically coupled to the liquid crystal cell to receive light from said region in the transparent mode and effective to transmit the predetermined color;

a back polarizer optically coupled to the retardation film to receive light therefrom and effective to selectively transmit the predetermined color; and a reflective holographic optical element optically coupled to the back polarizer and having at least one effective color band effective to redirect the predetermined color toward the back polarizer.

* * * * *